United States Patent

Cho

[11] Patent Number: 5,813,895
[45] Date of Patent: Sep. 29, 1998

[54] TOY EGG

[76] Inventor: Deborah A. Cho, 2210 Dean St. Unit G, St. Charles, Ill. 60175

[21] Appl. No.: 883,741

[22] Filed: Jun. 27, 1997

[51] Int. Cl.[6] .............................. A63H 23/00; A63H 3/36
[52] U.S. Cl. ........................... 446/153; 446/368; 446/385
[58] Field of Search .............................. 446/4, 5, 69, 79, 446/153, 310, 368, 386, 901, 385

[56] References Cited

U.S. PATENT DOCUMENTS

| | | |
|---|---|---|
| 608,794 | 8/1898 | Quinn . |
| 685,345 | 10/1901 | Perkins et al. . |
| 3,091,053 | 5/1963 | Growald ...................................... 46/116 |
| 3,680,250 | 8/1972 | Hetrick ................................. 43/54.5 R |
| 4,881,915 | 11/1989 | Liaw ...................................... 446/153 |
| 5,273,476 | 12/1993 | Dorfman .................................. 446/73 |
| 5,316,689 | 5/1994 | Farrell ..................................... 446/153 |
| 5,447,584 | 9/1995 | Shakespeare et al. .................... 156/63 |

*Primary Examiner*—Robert A. Hafer
*Assistant Examiner*—Laura Fossum
*Attorney, Agent, or Firm*—Welsh & Katz, Ltd.

[57] ABSTRACT

A toy simulates a realistic hatching from an egg of an animal-like figure. Two halves of a plastic egg-shaped shell are joined by a liquid-soluble adhesive. Liquid can enter into liquid channels in the shell to dissolve the adhesive, "hatching" the figure in the shell.

17 Claims, 1 Drawing Sheet

TOY EGG

BACKGROUND OF THE INVENTION

The present invention relates to toy eggs which simulate the realistic hatching of an animal-like figure from a shell.

Such toys are known in which the animal "hatches" because it is spring-loaded, or because the adhesive joining the parts of the shell are melted by heat. Other devices rely on immersion of the shell in water to dissolve the adhesive, or immersion to allow water to enter the inside cavity of the shell through passages in order for a sponge inside the cavity to absorb the water, expand and push the shell apart along fracture lines.

It is desirable to have such toys, without the need to submerge the toy in water, without the need for a resilient expandable figure, and without the need for the figure to become saturated with water. It is also desirable for such toys to be able to be used by small children, while minimizing the likelihood of unpleasant conditions which can arise when small children play with water.

SUMMARY OF THE INVENTION

Therefore, it is an object of the present invention to provide a toy which simulates a realistic hatching from an egg of an animal-like figure.

A further object of the present invention is to provide a toy egg in which the pieces of the egg-shaped shell are joined by a liquid-soluble adhesive, which is not harmful if ingested by small children.

A further object of the present invention is to provide a toy egg in which the animal-like figure in the egg need not be resilient or expandable.

A further object of the present invention is to provide a toy egg in which the adhesive joining the pieces of the egg-shaped shell can be dissolved without submerging the toy in water, and without the animal-like figure in the egg becoming saturated with water.

A further object of the present invention is to provide a toy egg in which the adhesive joining the pieces of the shell are dissolved due to liquid which travels through interconnected channels within one piece of the the shell. Liquid can enter into the channels from an opening in the outside surface of the shell. The liquid can reach and dissolve the adhesive, without flooding the interior cavity in which the animal-like figure is located.

A further object of the present invention is to coat the shell with a material which will assist in preventing the pieces of the shell from separating prematurely, which is liquid-soluble, and which will provide a more realistic tactile sensation than the material of which the shell is made.

DETAILED DESCRIPTION OF THE INVENTION

Figure 1:
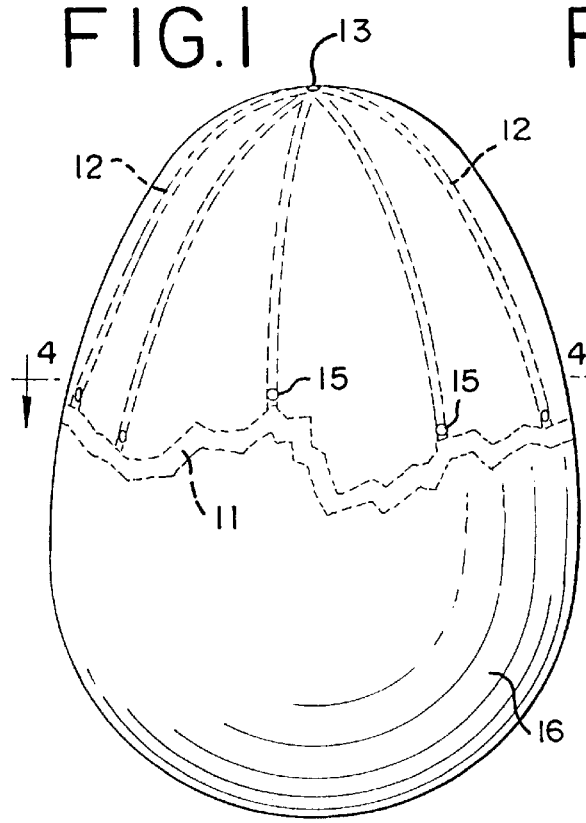
FIG. 1 is a perspective view of the present invention, with liquid channels and fractures in the shell shown in phantom.

A toy egg is constructed of at least two pieces of an egg-shaped shell, as best seen in FIG. 1. The shell 10 may be composed of a conventional hard plastic material such as high density polyethylene, polypropylene, polycarbonate, polystyrene, polybutylene, ethylene vinyl acetate, polyvinyl chloride, acrylonitrile butadiene styrene or the like. The pieces of the shell 10 are joined by an edible liquid-soluble adhesive 11 such as one made from a sugar, a starch, or an edible gum. The adhesive 11 should not be harmful if ingested by small children.

Figure 3:
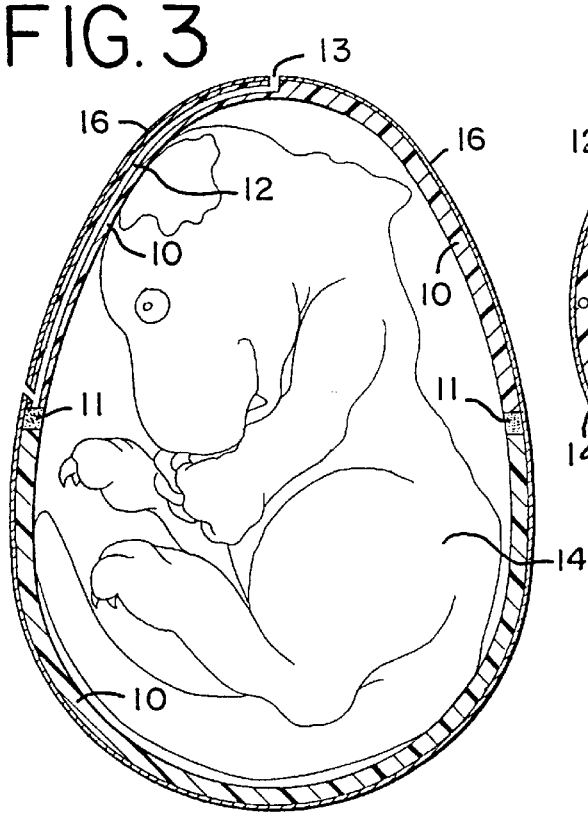
FIG. 3 is a longitudinal sectional view taken along line 3—3 in FIG. 2, showing an animal-like figure within the shell.
Figure 4:
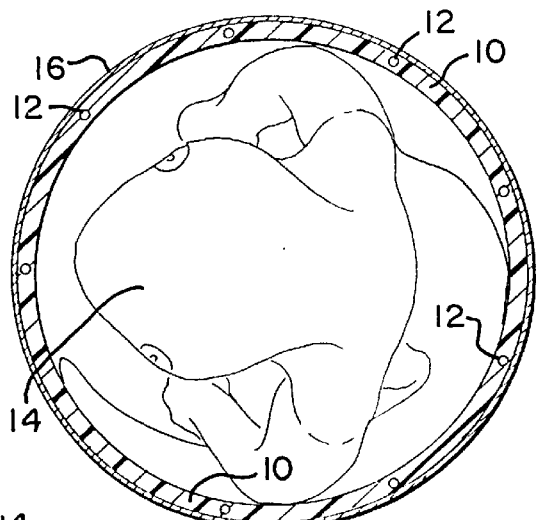
FIG. 4 is a cross-sectional view taken along line 4—4 in FIG. 1, showing an animal-like figure within the shell.

As best seen in FIG. 3, there is an animal-like FIG. 14 within the shell 10.

Figure 2:
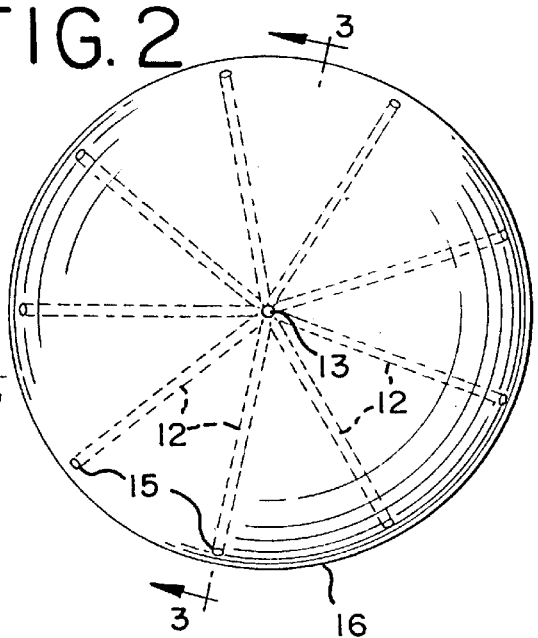
FIG. 2 is a top view of the present invention with liquid channels in the shell shown in phantom.

There is at least one liquid channel 12, but preferably a plurality of liquid channels 12, within one piece of the shell 10. The channels 12 are interconnected so that a liquid, preferably water, can enter each of the channels 12 through an opening 13 in the shell 10. This can be accomplished by pouring the liquid into the opening. Vents 15 will allow the liquid to move down through the channels 12. FIGS. 1 and 2 show the channels 12 joined at the opening 13. In some embodiments of the present invention, there can be branching of the channels 12. The channels 12 lead to the fractures where the pieces of the shell 10 are joined by the adhesive 11, so that the adhesive may be dissolved when liquid is injected into the opening 13.

In some embodiments of the present invention, the shell 10 can be coated with a liquid-soluble material such as paper-mâché. It can be applied by spraying or by other conventional methods known in the crafts industry, as long as the opening 13 and the vents 15 are not blocked. This may be facilitated by temporarily inserting plugs into the opening 13 and the vents 15 during the coating process. While the vents 15 shown in FIGS. 1, 2, and 3 extend from the liquid channels 12 to outside of the shell, they also could lead to inside of the shell 10. In that case, there would not be any concern about blocking the vents during the coating process. The coating 16 will assist in preventing the pieces of the shell 10 from separating prematurely, and will provide a more realistic tactile sensation than the material, such as hard plastic, of which the shell 10 is composed.

The figures are not drawn to scale, but are drawn in a way which will demonstrate the features being discussed. The liquid channels 12 and/or the vents 15 may be proportionately larger or smaller to achieve the performance desired.

While a number of embodiments of the invention have been described, it should be understood that there is no intent to limit the invention by such disclosure. Rather, it is intended to cover all modifications and alternative constructions that fall within the spirit and the scope of the invention as defined in the following claims.

What is claimed is:

1. A toy egg comprising:

a shell with an outer surface, an inner surface defining an interior hollow cavity, and a central portion between the outer and inner surfaces,;

a toy figure located in said cavity;

the shell being formed of at least two pieces which are joined by a liquid-soluble adhesive disposed in the central portion;

at least one internal channel substantially surrounded by the central portion of one of said pieces, and communicating with the adhesive;

an access to said channel defining an opening in the outer surface of the shell, so that liquid may be entered into said opening and may move through the channel to the adhesive without flooding the cavity, causing the adhesive to dissolve and the pieces of the shell to separate exposing the toy figure.

2. A toy egg as set forth in claim 1 wherein the shell is made of a hard plastic material.

3. A toy egg as set forth in claim 2 wherein the plastic material is selected from the group consisting of high density polyethylene, polypropylene, polycarbonate, polystyrene, polybutylene, ethylene vinyl acetate, polyvinyl chloride, and acrylonitrile butadiene styrene.

4. A toy egg as set forth in claim 1 wherein the adhesive is not harmful if ingested by small children.

5. A toy egg as set forth in claim 1 wherein the adhesive is made from a sugar.

6. A toy egg as set forth in claim 1 wherein the adhesive is made from a starch.

7. A toy egg as set forth in claim 1 wherein the adhesive is made from an edible gum.

8. A toy egg as set forth in claim 1 wherein the toy figure is an animal-like figure.

9. A toy egg as set forth in claim 1 wherein the at least one channel comprises a plurality of interconnected channels.

10. A toy egg as set forth in claim 1, further comprising a liquid-soluble coating on the outer surface of the shell.

11. A toy egg as set forth in claim 10 wherein the coating is made of paper-mâché.

12. A toy egg as set forth in claim 1 wherein the adhesive is water-soluble.

13. A toy egg as set forth in claim 12, further comprising a water-soluble coating on the outer surface of the shell.

14. A toy egg as set forth in claim 13 wherein the coating is made of paper-mâché.

15. A toy egg comprising:

a shell with an outer surface and an inner surface, the inner surface defining an interior hollow cavity;

a toy figure located in said cavity;

the shell being formed of at least two pieces which are joined by a water-soluble adhesive;

at least one channel inside at least one of said pieces;

an end of said channel defining an opening in the outer surface of the shell, wherein liquid may be entered into said opening causing the adhesive to dissolve and the pieces of the shell to separate exposing the toy figure;

a paper-mâché coating on the outer surface of the shell;

wherein the shell is made of a hard plastic material.

16. A toy egg as set forth in claim 15 wherein the toy figure is an animal-like figure.

17. A toy egg as set forth in claim 16 wherein the at least one channel comprises a plurality of interconnected channels.

\* \* \* \* \*

UNITED STATES PATENT AND TRADEMARK OFFICE
CERTIFICATE OF CORRECTION

PATENT NO. : 5,813,895
DATED : Sep. 29, 1998
INVENTOR(S) : Cho

It is certified that error appears in the above-identified patent and that said Letters Patent is hereby corrected as shown below:

In column 2, line 9, please delete "FIG. 14", and insert therefor --figure 14--.

Signed and Sealed this

Twenty-ninth Day of December, 1998

Attest:

BRUCE LEHMAN

Attesting Officer     Commissioner of Patents and Trademarks